United States Patent
Graber

(10) Patent No.: US 6,959,729 B2
(45) Date of Patent: Nov. 1, 2005

(54) CONTROL CARTRIDGE FOR REGULATING THE WATER FLOW AT A WATER OUTLET OF A FITTING

(75) Inventor: Heinz Graber, Oberkulm (CH)

(73) Assignee: KWC AG, Unterkulm (CH)

( * ) Notice: Subject to any disclaimer, the term of this patent is extended or adjusted under 35 U.S.C. 154(b) by 184 days.

(21) Appl. No.: 10/401,568

(22) Filed: Mar. 31, 2003

(65) Prior Publication Data

US 2003/0196712 A1 Oct. 23, 2003

(30) Foreign Application Priority Data

Apr. 20, 2002 (EP) .......................................... 02008893

(51) Int. Cl.⁷ .............................................. F16K 11/06
(52) U.S. Cl. .................. 137/625.31; 137/801; 251/340
(58) Field of Search ........................ 137/616.7, 625.31, 137/625.41, 801; 251/340

(56) References Cited

U.S. PATENT DOCUMENTS

| | | | |
|---|---|---|---|
| 4,554,948 A | 11/1985 | Bergmann | |
| 5,095,934 A | * 3/1992 | Iqbal | ......................... 137/270 |
| 5,127,438 A | * 7/1992 | Williams | ............... 137/625.31 |
| 6,328,067 B1 | * 12/2001 | Hsiung | ...................... 137/615 |

FOREIGN PATENT DOCUMENTS

| | | |
|---|---|---|
| DE | 1 153 581 | 8/1963 |
| DE | 39 35 460 A1 | 5/1990 |
| EP | 0 453 287 A1 | 10/1991 |
| EP | 0 616 156 B2 | 9/1994 |
| FR | 2 525 319 | 10/1983 |

* cited by examiner

Primary Examiner—John Fox
(74) Attorney, Agent, or Firm—Oliff & Berridge, PLC

(57) ABSTRACT

The invention relates to a control cartridge and to a fitting equipped therewith, for regulating the water flow at a water outlet of a fitting. The control cartridge comprises a first control element which is provided with passage holes and can be rotated about an axis, and a stationary, second control element which bears against the first control element and is provided with passage holes, and an actuating element, the first control element and the second control element being arranged in a cartridge housing. The actuating element is connected in a rotationally fixed manner to the first control element via a connection reaching through the cartridge housing. When in use, the cartridge housing can be connected fixedly to a first outlet part of the water outlet and is capable of holding a second outlet part which, when in use, is arranged downstream with respect to the first outlet part.

14 Claims, 4 Drawing Sheets

CONTROL CARTRIDGE FOR REGULATING THE WATER FLOW AT A WATER OUTLET OF A FITTING

BACKGROUND OF THE INVENTION

1. Field of Invention

The invention relates to a control cartridge for regulating water flow and to a fitting having at least one water outlet. The present application claims priority to European Application 02 008 893.6 filed Apr. 20, 2002.

2. Description of the Related Art

In many fittings, in particular those having two water outlets which can be used independently of each other, it is necessary to regulate the water flow directly by means of a valve arranged on the water outlet. Fittings of this type have a single-piece water outlet. The valve is situated at the end of the water outlet. Because the predetermined axial dimensions of the valve mean that it can only be fitted in a cylindrical section of the water outlet, the water outlet must have, at its end, a cylindrical section for accommodating the valve. Because this end is directed downward in most fittings, a certain minimum height of the fitting body is defined and the height must not fall short of this. Very compact fittings having a low overall height cannot therefore be realized for space reasons.

Valves used for fittings of this type conventionally have two control elements which are provided with through-holes, can be rotated relative to each other and are inserted directly into the water outlet. One of the two control elements is connected rotatably to an actuating element. Rotation of the actuating element causes the holes of the rotatable control element to be brought into overlap with those of the positionally fixed control element, with the result that the valve opens.

Because the control elements are arranged directly in the water outlet, the entire water outlet has to be replaced if the valve is to be exchanged.

European Patent EP-B-0 616 156 describes a control cartridge having a valve of this type which additionally takes on the function of mixing hot and cold water. For this purpose, hot and cold water supplied separately to the control cartridge, are metered by the control elements and mixed in a mixing chamber.

SUMMARY OF THE INVENTION

The present invention is based on the object of providing a valve for regulating the water flow at a water outlet. This valve, when in use, can be used to reduce the overall height of a fitting. The water flow through the valve is to be regulated at the outlet. Furthermore, a fitting having a reducible overall height is to be supplied.

This object is achieved according to the invention by a valve in the form of a control cartridge for regulating the flow of water and a fitting having at least one water outlet. Advantageous developments are illustrated in more detail below.

The fitting according to the invention has a water outlet which comprises a first outlet part and a second outlet part. The control cartridge according to the invention is arranged between the first outlet part and the second outlet part. The overall height can be reduced, since the control cartridge can be arranged horizontally.

The control cartridge according to the invention has a rotatable, first control element provided with passage holes, a positionally fixed, second control element which bears against the first control element and is likewise provided with passage holes, and an actuating element. The first and second control elements are arranged in a cartridge housing, with the actuating element being connected in a rotationally fixed manner to the first control element via a connection reaching through the cartridge housing. When in use, the cartridge housing can be connected fixedly to the first outlet part of the water outlet and is capable of holding the second outlet part which is situated downstream with respect to the first outlet part.

The control cartridge according to the invention takes on both the regulation of the water flow and also the securing and connection of the two outlet parts. The special design of the control cartridge enables it to form a fixed unit in the form of a cartridge which is screwed into the first outlet part. This design is made possible by the cartridge housing which serves as sole securing means for the control elements and the inner ring and also holds these parts in a centered and concentric manner with respect to each other. The cartridge housing furthermore takes on the sealing of the ceramic discs and of the second outlet part. The control cartridge can thus be preassembled as a unit and then be screwed from the front into the first outlet part. The second outlet part is then fastened to the control cartridge which preferably serves as sole support of the second outlet part and centers the latter.

Accordingly, exchanging the control cartridge where necessary turns out to be very easy. In particular, the second outlet part can be exchanged without any problem in order to replace it, for example, by a longer outlet part or by a different type of outlet part. In addition, the modular construction of the fitting results in great flexibility for retailers and customers. The agreeable operation of the control cartridge is likewise advantageous. Since said control cartridge is not situated at the end of the water outlet, the operator does not become wet when opening the control cartridge. When closing the control cartridge, the water present on the hands drips into the wash basin and not onto the rear ledge or edge of the wash basin where lime could accumulate.

According to an advantageous development of the invention, the control cartridge also takes on a mixing function in addition to regulating the water flow. In this case, hot and cold water are supplied separately to the control cartridge, metered by the control elements and mixed in a mixing chamber, as is described, for example, in European Patent EP-B-0 616 156. As a result, the mixing cartridge in the fitting body can advantageously be omitted.

BRIEF DESCRIPTION OF THE DRAWINGS

Examples for the invention are illustrated in the drawings and described below. In the drawings, purely diagrammatically.

DETAILED DESCRIPTION OF EXEMPLARY EMBODIMENTS

Figure 1:
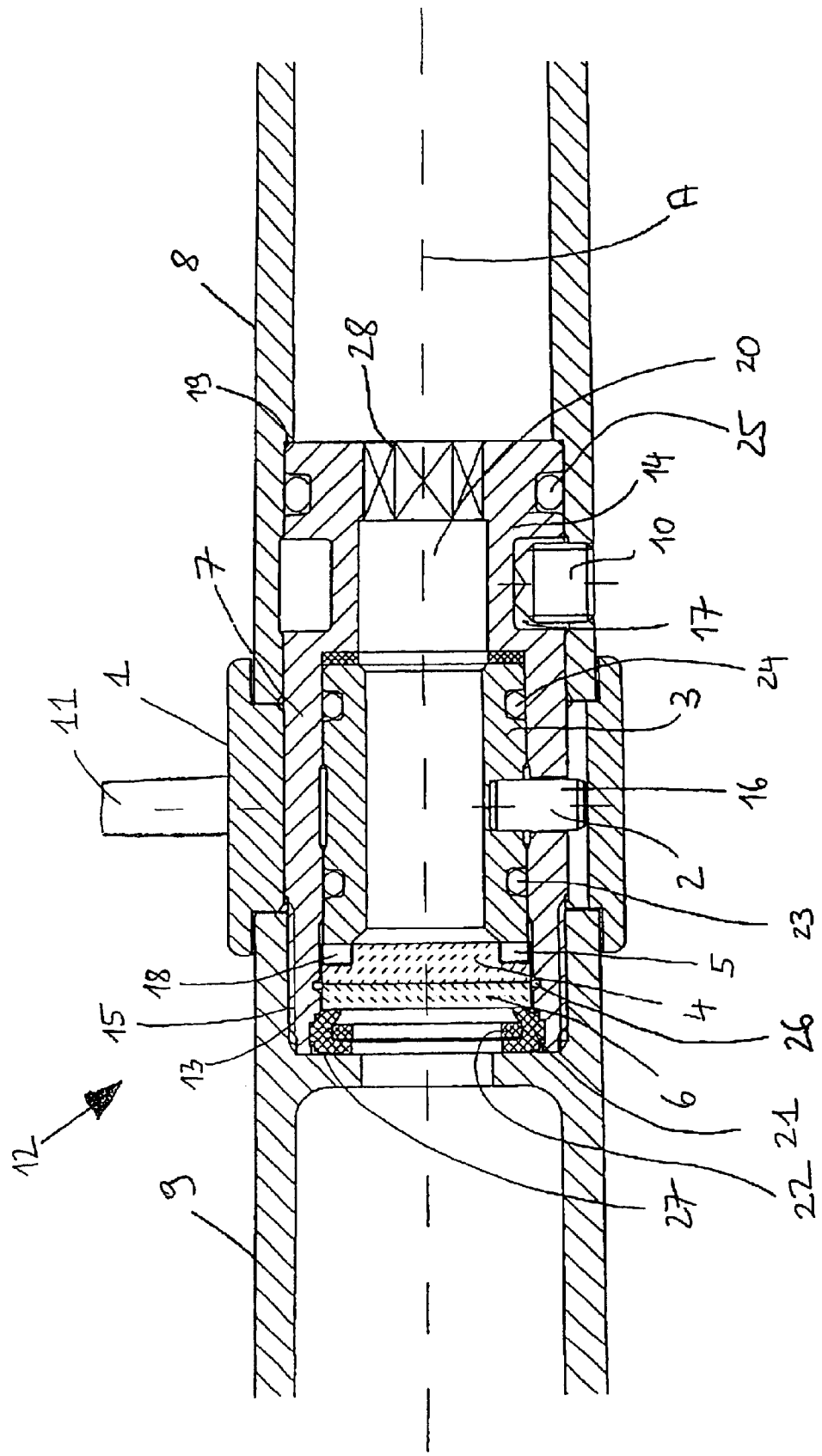
FIG. 1 shows a control cartridge arranged between two outlet parts, in cross section according to the invention.
Figure 3:
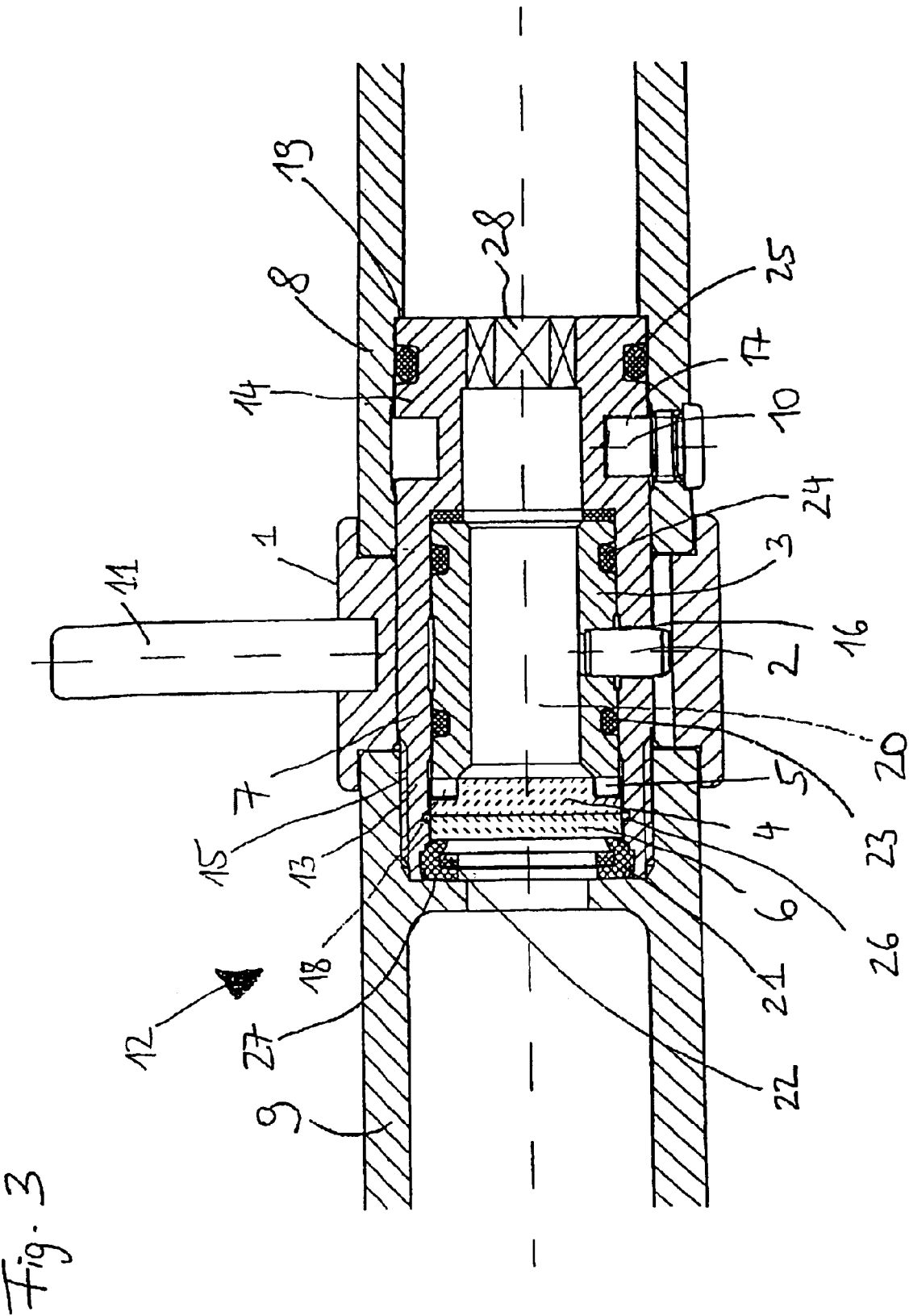
FIG. 3 shows a further control cartridge arranged between two outlet parts, in cross section with a rotatable outlet part according to the invention.
Figure 4:
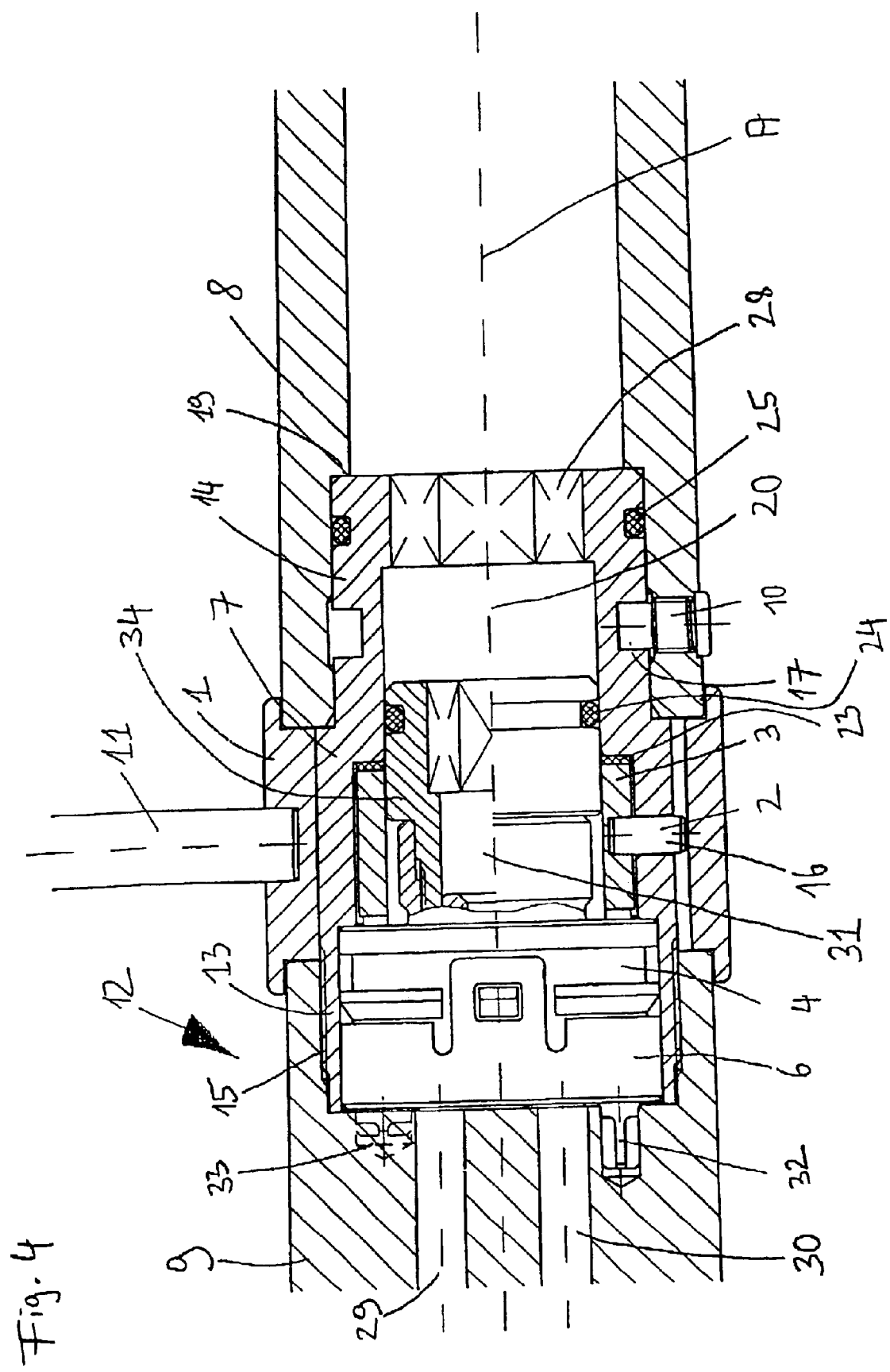
FIG. 4 shows a further control cartridge arranged between two outlet parts with a mixing function, in cross section according to the invention.

In the drawings, three embodiments of the control cartridge are illustrated in FIG. 1, FIG. 3 and FIG. 4 according to one exemplary embodiment of the invention. The control cartridges in FIG. 1 and FIG. 3 differ only in the manner of the fastening of a second outlet part 8 of the water outlet 12 to the control cartridge. The control cartridge in FIG. 4 also takes on a mixing function in addition.

Figure 2:
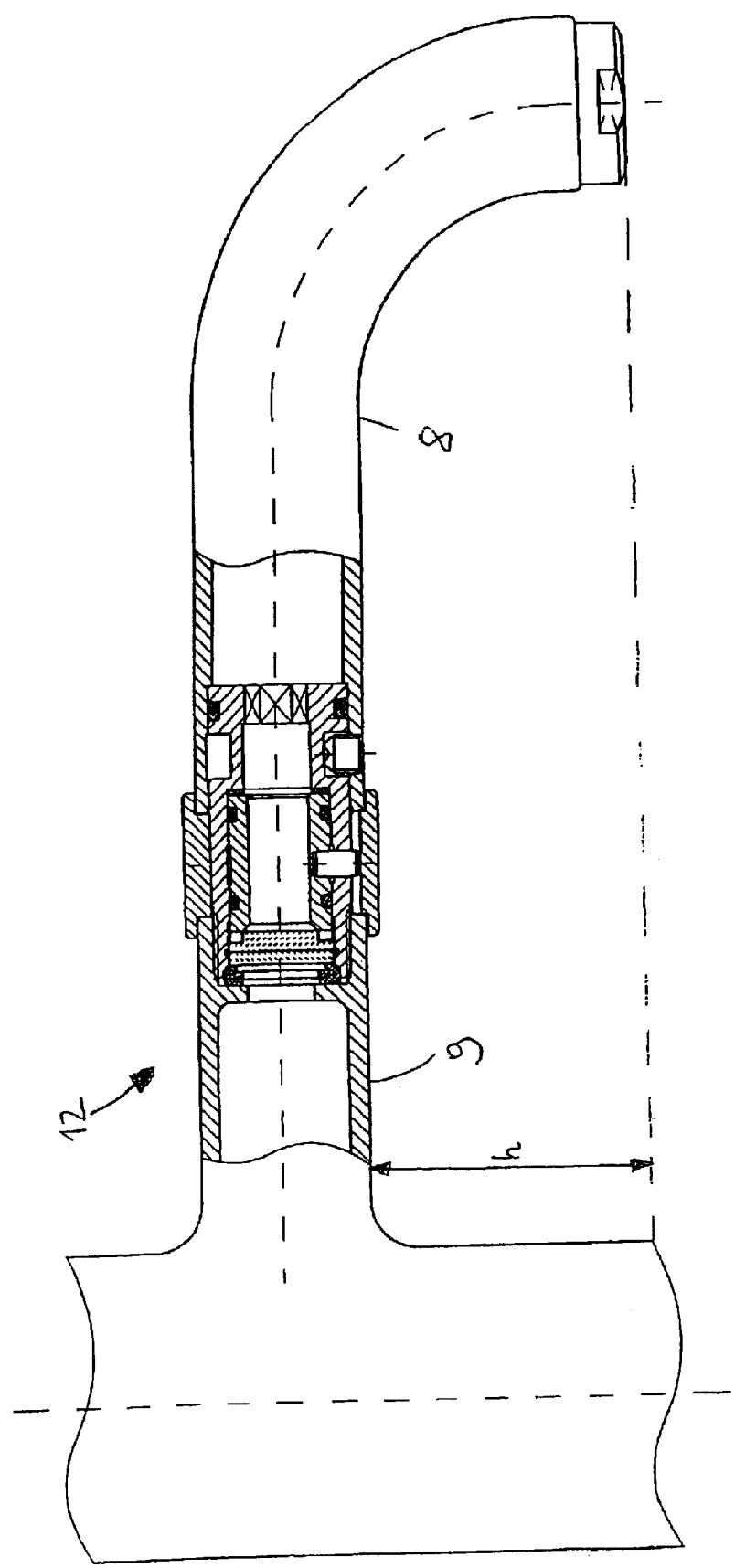
FIG. 2 shows the control cartridge from FIG. 1 arranged on the water outlet of a fitting, in cross section according to the invention.

FIG. 1 shows the control cartridge in the fitted state. The control cartridge comprises an essentially cylindrical cartridge housing 7 which has an external thread 15 on an end region 13. The external thread is used to screw the cartridge housing 7 into the first outlet part 9. For this purpose, the cartridge housing 7 has, on an end region 14 situated downstream, a hexagonal socket 28 which can accommodate a tool in a rotationally fixed manner. The tool is used to screw the cartridge housing 7 into the first outlet part 9. The end of the end region 13 of the cartridge housing 7 bears against a first stop 27 within the first outlet part 9. Because the cartridge housing 7 protrudes over the first outlet part 9, the second outlet part 8 can be placed, as shown in FIGS. 1 to 3, onto that end region 14 of the cartridge housing 7 which is situated downstream. The fastening to the control cartridge takes place by means of a fixing screw 10 which projects into a recess 17 in the end region 14. The right end of the cartridge housing 7 bears against a second stop 19 of the second outlet part 8. This achieves the effect of spacing apart the two outlet parts from each other, with the user gaining access to the actuating element situated in between. The first outlet part 9 is, as FIG. 2 shows, a straight, cylindrical pipe and the second outlet part 8 is a curved, cylindrical pipe.

The control cartridge furthermore comprises an inner ring 3 which can be rotated about an axis A and is situated within the cartridge housing 7. The inner ring 3 has carry-along cams 5, 18 via which the inner ring 3 is connected in a rotationally fixed manner to a first control element 4 provided with passage holes. A second control element 6, which is provided with passage holes, is situated bearing against the first control element 4. In the present case, the control elements 4, 6 are valve disks, preferably made from ceramic, which are provided with passage holes. The second control element 6 is held in a positionally fixed manner by means of holding elements 26 arranged on the end region 13 of the cartridge housing 7.

It is likewise conceivable for the inner ring 3 and the first control element 4 and/or the cartridge housing 7 and the second control element 6 to be a single part. In order to open the control cartridge, the first control element 4 has to be rotated about the axis A, so that its passage holes overlap with those of the positionally fixed, second control element 6. This takes place by means of an annular actuating element 1 which is situated on the radially outer edge of the control cartridge and which preferably has an actuating handle 11 for this purpose. The actuating element 1 is connected in a rotationally fixed manner to the inner ring 3 via a carry-along pin 2 reaching through an opening 16 in the cartridge housing 7. The opening 16 covers a certain angular region about the axis A, with the result that the actuating element can be rotated in this angular region. If the actuating element 1 is rotated with the actuating handle 11 about the axis A, then the inner ring 3 and the first control element 4 likewise rotate about the axis A.

In the opened state of the control cartridge, the water first flows through the first outlet part 9, then through a channel 20 formed within the inner ring 3 and the cartridge housing 7, and finally through the second outlet part 8.

The water-conducting spaces are sealed by a sealing element 21. This is shown in the present case as a lip seal, which is arranged on the end region 13. The sealing element 21 is held in the radial direction by a sealing supporting ring 22, and by two sealing rings 23, 24 arranged on the inner ring 3 and a sealing ring 25 arranged on the end region 14.

FIG. 2 shows the control cartridge from FIG. 1 in the fitted state on a water outlet of a fitting. As is apparent, the minimum overall height of the fitting is determined only by that height h of the second outlet part 8 which is necessary for the curvature. The control cartridge in FIG. 3 differs from the control cartridge from FIG. 1 by the fact that the fixing screw 10 is not pressed against the bottom of the recess 17. As a result, the second outlet part 8 can be rotated about the axis A.

In FIG. 4, the first outlet part 9 has a hot water channel 29 which, when in use, conducts hot water, and a cold water channel 30 which is separated fluid-dynamically therefrom and, when in use, conducts cold water. Said channels open into a respective passage hole in the second control element 6. In that end region 13 of the cartridge housing 7 which is situated upstream, the second control element 6 is connected in a rotationally fixed manner to the first outlet part 9 by means of cams 32, 33. The first control element 4 can be rotated about the axis A by rotation of the actuating element 1.

The passage holes are designed in such a manner that when the first control element 4 is rotated in the opening direction, first of all the supply of cold water via the cold water channel 30 is opened up to approximately the maximum, then in addition the supply of hot water via the hot water channel 29 is opened up and then the supply of cold water is restricted again. The water flowing out of the hot water channel 29 and cold water channel 30 is mixed in a mixing chamber 31 arranged downstream of the control elements 4, 6.

The mixing chamber 31 is formed in the cartridge housing 7. In the present case, it is bounded by an additional sleeve 34, but may also be bounded directly by the cartridge housing 7 and/or the inner ring 3. It is likewise possible that instead of the hot water channel 29 and the cold water channel 30 in the first outlet part 9, a cold water conduit and a separate hot water conduit are connected to the control cartridge. In this case, the control cartridge has corresponding connections which can be connected to conduits guided in the fitting. An example for the design of the control elements 4, 6 is illustrated in EP-B-0 616 156.

While the invention has been described with reference to exemplary embodiments thereof, it is to be understood that the invention is not limited to the disclosed embodiments or constructions. To the contrary, the invention is intended to cover various modifications and equivalent arrangements. In addition, while the various elements of the embodiments are shown in various combinations and configurations, which are exemplary, other combinations and configurations, including more, less or a single element, are also within the spirit and scope of the invention.

What is claimed is:

1. A fitting, comprising:
    a water outlet including a first outlet part in the form of a cylindrical pipe and a second outlet part in the form of a cylindrical pipe arranged downstream of the first outlet part; and
    a control cartridge disposed between the first outlet part and the second outlet part, comprising:
        a first control element which is provided with passage holes and is rotatable about an axis;
        a stationary, second control element which bears against the first control element and is provided with passage holes and, wherein the first control element and the second control element are arranged in a cartridge housing;

an annular actuating element disposed on a radially outer surface of the cartridge housing; and an inner ring disposed radially within the cartridge housing, with the actuating element being connected in a rotationally fixed manner to the inner ring via a connection reaching through the cartridge housing, and the inner ring is connected to the first control element in a rotationally fixed manner, wherein the cartridge housing is made in one piece and comprises a substantially cylindrical form, the cartridge housing has an external thread on an upstream end region which is screwed in the first outlet part, the second outlet part is disposed onto and fixedly connected to a downstream end region of the cartridge housing, and the first outlet part and the second outlet part end by the actuating element.

2. The fitting according to claim 1, wherein the control cartridge serves as sole mounting support for the second outlet part.

3. The fitting according to claim 1, wherein the first outlet part is a cylindrical pipe with a rectilinear profile, and the second outlet part is a curved, cylindrical pipe.

4. The fitting according to claim 1, wherein the first outlet part comprises a hot water channel and a cold water channel separated fluid-dynamically therefrom, and the hot water channel and the cold water channel open into different passage holes of the second control element.

5. The control cartridge according to claim 1, wherein the cartridge housing, the control elements and the inner ring are arranged coaxially to one another with respect to the axis.

6. The control cartridge according to claim 1, wherein the second outlet part is placed rotatably onto the downstream end region of the cartridge housing and held by a fixing screw engaging a recess situated in the downstream end region of the cartridge housing.

7. A control cartridge for regulating the water flow at a water outlet of a fitting, comprising:

a first control element which is provided with passage holes and is rotatable about an axis;

a stationary second control element which bears against the first control element and is provided with passage holes, the first control element and the second control element being arranged in a cartridge housing;

an annular actuating element disposed on a radially outer surface of the cartridge housing; and an inner ring disposed radially within the cartridge housing, wherein the actuating element is connected in a rotationally fixed manner to the inner ring via a connection reaching through the cartridge housing and the inner ring is connected to the first control element in a rotationally fixed manner, the cartridge housing being made in one piece and comprising a substantially cylindrical form;

the cartridge housing having an external thread on an upstream end region which, when in use, is screwed in a first outlet part in the form of a cylindrical pipe, the cartridge housing having a downstream end region onto which, when in use, a second outlet part in the form of a cylindrical pipe is placed and fixedly connected to the cartridge housing, the actuating element being disposed between the external thread and the downstream end region, and, when in use, the first outlet part and the second outlet part end by the actuating element, respectively.

8. The control cartridge according to claim 7, wherein the cartridge housing surrounds the control elements and serves as their sole mounting support.

9. The control cartridge according to claim 7, wherein the cartridge housing essentially rotationally symmetrical with respect to the axis.

10. The control cartridge according to claim 7, wherein the cartridge housing, the control elements and the inner ring are arranged coaxially to one another with respect to the axis.

11. The control cartridge according to claim 7, wherein the first control element and the second control element are valve discs provided with passage holes.

12. The control cartridge according to claim 7, wherein the cartridge housing has, in the downstream end region, and a recess which can accommodate a fixing screw with which the second outlet part can be fastened to the cartridge housing.

13. The control cartridge according to claim 7, wherein the second control element has at least two passage holes to which, when in use, hot water and cold water are supplied separately, the first control element is able to regulate an amount of hot or cold water passing through the two passage holes, and a mixing chamber is arranged downstream of the first control element within the cartridge housing, in which chamber the two components flow together and are mixed.

14. The control cartridge according to claim 7, wherein the control cartridge has a connection for hot water and a connection for cold water.

* * * * *